United States Patent
Sueda et al.

(10) Patent No.: US 11,040,888 B2
(45) Date of Patent: Jun. 22, 2021

(54) LOW ALPHA DOSE BARIUM SULFATE PARTICLE, AND USE AND PROCESS FOR PRODUCING THE SAME

(71) Applicant: SAKAI CHEMICAL INDUSTRY CO., LTD., Osaka (JP)

(72) Inventors: Satoru Sueda, Fukushima (JP); Hironobu Ogata, Fukushima (JP)

(73) Assignee: SAKAI CHEMICAL INDUSTRY CO., LTD., Osaka (JP)

( * ) Notice: Subject to any disclaimer, the term of this patent is extended or adjusted under 35 U.S.C. 154(b) by 403 days.

(21) Appl. No.: 16/063,748

(22) PCT Filed: Dec. 23, 2016

(86) PCT No.: PCT/JP2016/088591
§ 371 (c)(1),
(2) Date: Jun. 19, 2018

(87) PCT Pub. No.: WO2017/111145
PCT Pub. Date: Jun. 29, 2017

(65) Prior Publication Data
US 2020/0270138 A1    Aug. 27, 2020

(30) Foreign Application Priority Data

Dec. 25, 2015  (JP) .............. JP2015-255448

(51) Int. Cl.
| | | |
|---|---|---|
| *C09C 1/02* | (2006.01) | |
| *C01F 11/46* | (2006.01) | |
| *C09D 7/62* | (2018.01) | |
| *C08K 3/30* | (2006.01) | |
| *C08L 101/00* | (2006.01) | |
| *C09C 3/06* | (2006.01) | |
| *C09C 3/04* | (2006.01) | |
| *C08K 9/02* | (2006.01) | |

(52) U.S. Cl.
CPC .............. *C01F 11/462* (2013.01); *C08K 3/30* (2013.01); *C08L 101/00* (2013.01); *C09C 1/027* (2013.01); *C09C 3/063* (2013.01); *C09D 7/62* (2018.01); *C01P 2004/61* (2013.01); *C01P 2006/44* (2013.01); *C08K 9/02* (2013.01); *C08K 2003/3045* (2013.01)

(58) Field of Classification Search
None
See application file for complete search history.

(56) References Cited

U.S. PATENT DOCUMENTS

| | | | |
|---|---|---|---|
| 3,979,282 A * | 9/1976 | Cundy | B03D 1/02 209/166 |
| 4,119,700 A * | 10/1978 | Stone | C01F 11/462 209/39 |
| 4,505,755 A * | 3/1985 | Shinozuka | C09C 1/027 106/431 |
| 6,274,662 B1 | 8/2001 | Lynch | |
| 2006/0119022 A1* | 6/2006 | Nam | C21B 13/14 266/172 |
| 2008/0226522 A1* | 9/2008 | McKee | C09C 1/027 423/170 |
| 2010/0263483 A1* | 10/2010 | Liubakka | C22B 4/08 75/10.13 |
| 2015/0111992 A1 | 4/2015 | Shimizu et al. | |
| 2015/0168839 A1* | 6/2015 | Kim | G03F 7/11 430/270.1 |

FOREIGN PATENT DOCUMENTS

| | | |
|---|---|---|
| JP | 53-060893 | 5/1978 |
| JP | 11-035319 | 2/1999 |
| JP | 11-92139 | 4/1999 |
| JP | 2002-541051 | 12/2002 |
| JP | 2008-50261 | 3/2008 |
| JP | 2009-519882 | 5/2009 |
| JP | 2012-513365 | 6/2012 |
| WO | 2014/007325 | 1/2014 |

OTHER PUBLICATIONS

Everett, J.E. "Mine Stockpile design to minimise environmental impact". Development and Application of Computer techniques to En. Stud. WIT Press. (2004). (Year: 2004).*
International Search Report dated Feb. 7, 2017 in International Application No. PCT/JP2016/088591.

* cited by examiner

*Primary Examiner* — Sheng H Davis
(74) *Attorney, Agent, or Firm* — Wenderoth, Lind & Ponack, L.L.P.

(57) ABSTRACT

The invention provides a low alpha dose barium sulfate particle having a silica content of 0.6% by weight or less, an average particle diameter of 1 μm or less, a sulfur content of 10 ppm or less, and an alpha dose of 0.07 cph/cm² or less.

4 Claims, No Drawings

LOW ALPHA DOSE BARIUM SULFATE PARTICLE, AND USE AND PROCESS FOR PRODUCING THE SAME

TECHNICAL FIELD

The present invention relates to a low alpha dose barium sulfate particle, and use and a process for producing the same. More specifically, the invention relates to a low alpha dose barium sulfate particle having an average particle diameter of 1 μm or less and a silica content of 0.6% by weight or less, a sulfur content of 10 ppm or less, and an alpha dose of 0.07 cph/cm$^2$ or less, and a process for producing the same. The invention further relates to use of such a low alpha dose barium sulfate particle.

BACKGROUND ART

With miniaturization and high integration of electronic components in recent years, the problem of semi-permanent damage in which a memory chip or the like in an electronic device malfunctions, that is, the problem of so-called soft errors, becomes conspicuous. One of the causes for such a soft error is an α-ray generated from an α-ray source such as U, Th, Ra or the like contained in inorganic materials in electronic components. For example, with miniaturization and high integration of electronic components, underfill layers constituting the electronic component become thinned, and as a result, there arises a problem that even weak α-rays derived from a solder resist layer affects the charges of memory chip.

Barium sulfate is made use of as a filler in various resin compositions. For instance, it is incorporated in a resist ink composition used for a resist layer of a printed wiring board. Thus, in recent years, there is an even stronger demand for low alpha dose barium sulfate to prevent the above-mentioned soft errors.

There are conventionally known two kinds of barium sulfate for industrial use, elutriation barium sulfate and precipitated barium sulfate. The former is obtained by crushing and classifying barite ore, and the latter is obtained by reducing barite ore, and leaching the generated barium sulfide into water to obtain an aqueous solution of barium sulfate, to which a chemical synthesis method is applied, for example, so that barium sulfide is reacted with sulfuric acid.

As a further example, there is known a method for obtaining barium sulfate having a narrow particle size distribution and improved dispersibility, in which an aqueous solution of barium sulfide is reacted with ammonium sulfate (see Patent Document 1). However, no mention is made of reduction of α-ray dosage of barium sulfate in the document.

A method for producing low alpha dose barium hydroxide or barium carbonate by applying a chemical synthesis method to an aqueous solution of barium sulfide as a starting material is already known (see Patent Document 2).

However, in recent years, a further reduction in α-ray dosage have been required not only for barium hydroxide and barium carbonate but also for barium sulfate itself. However, sufficiently low alpha dose barium sulfate has not yet been known, and as a matter of course, a method for producing barium sulfate having such a sufficiently low alpha dose in an efficient manner has not yet been known.

Further, in recent years, not only reduction of alpha dose but also reduction of sulfur content of barium sulfate has been strongly demanded. Herein the invention, the sulfur content in barium sulfate refers to the content of sulfur derived from sulfide present as impurities in the barium sulfate. As described above, because the precipitated barium sulfate passes through barium sulfide in the synthesis process, it has a high sulfur content.

As described above, barium sulfate is incorporated as a filler in various resin compositions, but when barium sulfate has a high sulfur content, it is not preferable to incorporate such barium sulfate in a resin composition as it causes undesirable deterioration, coloring, or thickening, etc., or in the case of electronic components, it may cause a problem of promoting corrosion of electrodes.

However, a low alpha dose barium sulfate particle having a sufficiently low alpha dose and sufficiently low sulfur content has not yet been known.

PRIOR ART

Patent Document

Patent Document 1: JP 2008-50261A
Patent Document 2: JPH 11-92139A

SUMMARY OF INVENTION

Technical Problems

The present inventors have intensively studied to solve the above-mentioned problems associated with barium sulfate, and as a result, they have found that when a crushed ore obtained by crushing barite ore and having an average particle diameter of 5-50 μm and an alpha dose of 1 cph/cm$^2$ or less is subjected to an elutriation treatment and/or a sieving treatment to remove coarse particles containing a large amount of silica to reduce the silica content to 0.6% by weight or less, and also the crushed ore is subjected to a media grinding treatment to reduce the average particle diameter to 1 μm or less, there is obtained a low alpha dose barium sulfate particle having an average particle diameter of 1 μm or less, a silica content of 0.6% by weight or less, an alpha dose of 0.07 cph/cm$^2$ or less, and in addition, a sulfur content of 10 ppm or less, without making use of chemical synthesis method, thus completing the present invention.

Incidentally, commercially available barium sulfate manufactured by Kishida Chemical Co., Ltd. (First grade, purity 98.0%) has a silica content of 0.18% by weight and an alpha dose of 3.36 cph/cm$^2$; one manufactured by Wako Pure Chemical Industries, Ltd. (Wako First grade) has a silica content of 0.18% by weight and an alpha dose of 3.19 cph/cm$^2$; one manufactured by Sigma-Aldrich (Purity 99%) has a silica content of 0.18% by weight and an alpha dose of 1.00 cph/cm$^2$; barium sulfate BAX-40 according to the Japanese Pharmacopeia (manufactured by Sakai Chemical Industry Co., Ltd. and having an average particle diameter of 5.0 μm) has a silica content of 0.17% by weight and an alpha dose of 2.03 cph/cm$^2$; and barium sulfate BAX-80 according to the Japanese Pharmacopeia (manufactured by Sakai Chemical Industry Co., Ltd. and having an average particle diameter of 9.0 μm) has a silica content of 0.17% by weight and an alpha dose of 2.40 cph/cm$^2$.

Accordingly, it is an object of the invention to provide a low alpha dose barium sulfate particle having an average particle diameter of 1 μm or less, a silica content of 0.6% by weight or less, an alpha dose of 0.07 cph/cm$^2$ or less, and in addition, a sulfur content of 10 ppm or less, and a process for producing such a low alpha dose barium sulfate particle. It is a further object of the invention to provide use of such a low alpha dose barium sulfate particle.

Solution to Problem

The invention provides a low alpha dose barium sulfate particle having an average particle diameter of 1 μm or less, a silica content of 0.6% by weight or less, a sulfur content of 10 ppm or less, and an alpha dose of 0.07 cph/cm² or less.

The invention further provides a process for producing such a low alpha dose barium sulfate particle as described above.

In addition, the invention provides a process for producing a low alpha dose barium sulfate particle, comprising:

subjecting a crushed ore obtained by crushing barite ore and having an average particle diameter of 5-50 μm and an alpha dose of 1 cph/cm² or less to;

(a) an elutriation treatment and a media grinding in this order; or (b) a media grinding treatment and a sieving treatment in this order; or (c) an elutriation treatment, a media grinding treatment and a sieving treatment in this order, wherein in the media grinding treatment, the crushed ore is ground to a powder ore having an average particle diameter of 1 μm or less while coarse particles are removed by the elutriation treatment and/or the sieving treatment to obtain a powder ore having a silica content of 0.6% by weight or less, thereby obtaining a low alpha dose barium sulfate particle having an average particle diameter of 1 μm or less, a silica content of 0.6% by weight or less, an alpha dose of 0.07 cph/cm² or less, and a sulfur content of 10 ppm or less.

In the process for producing a low alpha dose barium sulfate particle according to the invention, the crushed ore used as a starting material and having an average particle diameter of 5-50 μm and an alpha dose of 1 cph/cm² or less has preferably a silica content in the range of 0.65 to 3.5% by weight, particularly preferably in the range of 0.65 to 1% by weight, in order to have an improved efficiency of the elutriation treatment and/or the sieving treatment.

According to the invention, the treatment of (a), (b) or (c) may be carried out after the crushed ore has been subjected to an acid heating treatment, that is, a heating treatment in the presence of an acid.

The invention further provides a process for producing a surface-treated low alpha dose barium sulfate particle which comprises obtaining a low alpha dose barium sulfate particle as described above, and then surface treating the low alpha dose barium sulfate particle with at least one selected from silica, silica hydrate and aluminum hydroxide.

Advantageous Effects of Invention

According to the process of the invention, a low alpha dose barium sulfate particle having an average particle diameter of 1 μm or less, a silica content of 0.6% by weight or less, a sulfur content of 10 ppm or less, and an alpha dose of 0.07 cph/cm² or less is obtained without making use of a chemical synthesis method.

The low alpha dose barium sulfate particle obtained by the process of the invention as described above is suitably used as a filler in various resin compositions. In particular, when the barium sulfate is incorporated as a filler in a resin composition, it causes no undesirable deterioration, coloring, or thickening, etc., and in the case of electronic components, it hardly promotes corrosion of electrodes or it hardly causes soft errors.

DESCRIPTION OF EMBODIMENTS

The process for producing a low alpha dose barium sulfate particle according to the invention will be described.

The process for producing a low alpha dose barium sulfate particle of the invention comprises:

subjecting a crushed ore obtained by crushing barite ore and having an average particle diameter of 5-50 μm and an alpha dose of 1 cph/cm² or less to:

(a) an elutriation treatment and a media grinding in this order; or (b) a media grinding treatment and a sieving treatment in this order; or (c) an elutriation treatment, a media grinding treatment and a sieving treatment in this order, wherein in the media grinding treatment, the crushed ore is ground to a powder ore having an average particle diameter of 1. μm or less while coarse particles are removed by the elutriation treatment and/or the sieving treatment to obtain a powder ore having a silica content of 0.6% by weight or less, thereby obtaining a low alpha dose barium sulfate particle having an average particle diameter of 1. μm or less, a silica content of 0.6% by weight or less, an alpha dose of 0.07 cph/cm² or less, and a sulfur content of 10 ppm or less.

Barite ore is different to a degree in the silica content and alpha dose depending on the area where it was mined. However, in the invention, a crushed ore having an average particle diameter of 5-50 μm, preferably 5-20 μm, a silica content of 0.65-3.5% by weight, preferably 0.65-1% by weight, and an alpha dose of 1 cph/cm² or less is obtained by appropriately selecting barite ore used and crushing the same.

In the invention, some kinds of crushed ores obtained by crushing barite ores mined in China or Mexico are suitably used as the crushed ore as described above, although depending on the area where they were mined.

In particular, the crushed ore having an average particle diameter of 5 to 20 μm, a silica content is 0.65 to 3.5% by weight, preferably 0.65 to 1.0% by weight, and an alpha dose of 0.5 cph/cm² or less, in particular, 0.25 cph/cm² or less is preferably used in the invention.

According to the process of the invention, the crushed ore is subjected to:

(a) an elutriation treatment and a media grinding in this order; or (b) a media grinding treatment and a sieving treatment in this order; or (c) an elutriation treatment, a media grinding treatment and a sieving treatment in this order.

In this way, according to the process of the invention, the crushed ore is subjected to a combination of an elutriation treatment and/or a sieving treatment, and a media grinding treatment, and in the media grinding treatment, the crushed ore is ground to a powder ore having an average particle diameter of 1 μm or less while coarse particles are removed by the elutriation treatment and/or the sieving treatment to obtain a powder ore having a silica content of 0.6% by weight or less, thereby obtaining a low alpha close barium sulfate particle having an average particle diameter of 1 μm or less, a silica content of 0.6% by weight or less, an alpha dose of 0.07 cph/cm² or less, and in addition, a sulfur content of 10 ppm or less is obtained.

More specifically, according to the treatment (a) mentioned above in the process of the invention, the crushed ore is subjected to an elutriation treatment to remove coarse particles so as to reduce the silica content of the crushed ore to 0.6% by weight or less, and then the crushed ore is subjected to a media grinding treatment to obtain a powder ore having an average particle diameter of 1 μm or less, thereby there is obtained a low alpha dose barium sulfate particle having a sulfur content of 10 ppm or less and an alpha dose of 0.07 cph/cm$^2$ or less.

According to the treatment (b), the crushed ore is subjected to a media grinding treatment to obtain a powder ore having an average particle diameter of 1 μm or less, and then the powder ore is sieved to have a silica content of 0.6% by weight or less, thereby there is obtained a low alpha dose barium sulfate particle having a sulfur content of 10 ppm or less and an alpha dose of 0.07 cph/cm$^2$ or less.

According to the treatment (c), the crushed ore is subjected to an elutriation treatment to remove coarse particles, followed by a media grinding treatment to obtain a powder ore having an average particle diameter of 1 μm or less, and then the powder ore is subjected to a sieving treatment, wherein the crushed ore is reduced in the silica content to 0.6% by weight or less by the elutriation treatment and/or the sieving treatment, thereby there is obtained a low alpha dose barium sulfate particle having an average particle diameter of 1 μm or less, a sulfur content of 10 ppm or less, and an alpha dose of 0.07 cph/cm$^2$ or less.

The elutriation treatment is an operation of sorting solid particles in a fluid based on the difference in the specific gravity of the solid particles to be sorted. According to the invention, an aqueous slurry of the crushed ore is placed in an elutriation bath, and elutriation water is supplied to the elutriation bath from the lower part thereof at a constant rate while a supernatant in the elutriation bath is recovered at the same rate at which the elutriation water is supplied, thereby the aqueous slurry is separated into two layers of a slurry layer containing a crushed ore having a large content of barium sulfate and hence having a large specific gravity, and a supernatant layer containing a crushed ore having a large content of silica and hence having a small specific gravity.

The crushed ore having a large content of barium sulfate and a large specific gravity has a high sedimentation rate in the elutriation bath, whereas the crushed ore having a large content of silica and a small specific gravity has a small sedimentation rate in the elutriation bath. Accordingly, the crushed ore having a large content of barium sulfate and a large specific gravity is recovered as an underflow from the elutriation bath, while the crushed ore having a large silica content and a low specific gravity is recovered as an overflow from the elutriation bath.

Thus, according to the invention, the crushed ore is effectively separated into two: a crushed ore having a large content of barium sulfate and a large specific gravity, and a crushed ore having a large content of silica and a small specific gravity by means of elutriation treatment. Incidentally, barium sulfate has a specific gravity of 4.5, while silica has a specific gravity of 2.2.

Various impurity components having a small specific gravity and impurity components having a small particle diameter are also removed by elutriating the crushed ore.

The factors influencing the separation efficiency of the solid particles by the elutriation treatment generally include the particle diameter of the solid particles, the density of the solid particles, and the density and viscosity of the fluid used in the elutriation treatment and the rate at which it is supplied to the elutriation bath.

In the invention, although not particularly limited, elutriation water which is adjusted to have a pH of 3 or less, preferably a pH of 2 or less, by using an inorganic acid such as sulfuric acid or hydrochloric acid or an organic acid is preferably used, and at the same time, the slurry layer containing the crushed ore having a high content of barium sulfate and having a large specific gravity is preferably adjusted to occupy about 70 to 90% of the total volume of the slurry charged in the elutriation bath by controlling the rate at which elutriation water is supplied to the elutriation bath.

In this manner, the crushed ore having a high content of silica and a small specific gravity is accelerated to be floated or levitated to the supernatant layer in the elutriation bath. Hence the crushed ore having a large content of silica and a small specific gravity is separated effectively as an overflow from the elutriation bath from the crushed ore having a large content of barium sulfate and a large specific gravity. In the invention, water containing sulfuric acid is particularly preferred as the acidic elutriation water.

Therefore, according to the invention, as described above, the crushed ore is subjected to an elutriation treatment in accordance with the step (a) to remove coarse particles having a high silica content in the crushed ore to obtain a crushed ore having a silica content of 0.6% by weight or less, and the crushed ore is then subjected to a media grinding treatment to obtain a powder ore having an average particle diameter of 1 μm or less, thereby there is obtained a low alpha dose barium sulfate particle having a sulfur content of 10 ppm or less and an alpha dose of 0.07 cph/cm$^2$ or less.

However, according to the invention, it is preferred that the crushed ore is subjected to a media grinding treatment with or without an elutriation treatment according to the step (b) or (c), and the powder ore thus obtained is then subjected to a sieving treatment to remove coarse particles therefrom, to obtain a powder ore having a silica content of 0.6% by weight or less, thereby there is obtained a low alpha dose barium sulfate particle having an average particle diameter of 1 μm or less, a silica content of 0.6% by weight or less, a sulfur content of 10 ppm or less, and an alpha dose of 0.07 cph/cm$^2$ or less.

According to the invention, in particular, it is preferred that after the crushed ore has been subjected to an elutriation treatment, it is subjected to a media grinding treatment, and the powder ore thus obtained is then subjected to a sieving treatment according to the step (c).

When the crushed ore is subjected to a media grinding treatment and then a sieving treatment according to the step (b) or (c), the barium sulfate after the sieving treatment has an average particle diameter substantially unchanged as compared to the barium sulfate after the media grinding treatment. However, as explained later, the sieving treatment reduces the silica content of barium sulfate obtained to provide a low alpha dose barium sulfate particle.

As well known, a media grinding treatment refers to wet-grinding solid particles using a grinding medium. In the invention, the grinding medium used has preferably a diameter of 0.8 mm or less so that the crushed ore is ground efficiently to a desired average particle diameter on an industrial scale, although the grinding medium is not limited to the above-exemplified.

When the crushed ore is subjected to a media grinding treatment, the crushed ore containing a large amount of barium sulfate is usually ground to a particle diameter of 1 μm or less, while the crushed ore containing a large amount of silica is usually not sufficiently ground to fine particles, but remains as coarse particles having a particle diameter of 40 to 50 μm in the crushed ore due to the difference in hardness between barium sulfate (having a Mohs hardness of 3.5) and silica. (having a Mohs hardness of 7).

The present inventors have found that when the crushed ore is subjected to a media grinding treatment to an average particle diameter of 1 μm or less, the component containing a large amount of silica tends to remain as coarse particles in the crushed ore as silica is harder than barium sulfate, and such coarse particles containing silica as a main component contain a large amount of components which function as α-ray generation sources.

Therefore, according to the invention, the crushed ore is preferably subjected to an elutriation treatment, and is then subjected to a media grinding treatment to an average particle diameter of 1 μm or less, and thereafter, the resultant obtained is preferably subjected to a sieving treatment to remove the coarse particles mentioned above, thereby effectively reducing the amount of silica in the powder ore obtained, thereby obtaining a barium sulfate particle having a low alpha dose.

The low alpha dose barium sulfate particle obtained by a media grinding treatment to an average particle diameter of 1 μm or less are superior in dispersibility in resins, and accordingly, it is suitably incorporated in a resin composition such as a coating composition or a resist ink. Such a resin composition effectively exhibits superior properties that barium sulfate possesses such as electrical insulation property, heat resistance, chemical stability against acid or alkali, resistance to resin degradation and the like.

The sieving treatment refers to an operation of sorting solid particles based on the particle diameter of the solid particles to be sorted. In the invention, the sieving treatment is performed after the crushed ore has been subjected to a media grinding treatment to a powder ore having an average particle diameter of 1 μm or less.

As described above, when the crushed ore is ground by the media grinding treatment, a crushed ore containing a large amount of barium sulfate is usually ground to a particle size of 1 μm or less, while a crushed ore containing a large amount of silica is usually not ground to fine particles, hut most of the resultant remain in the crushed ore as coarse particles having a particle size of 40 to 50 μm. Thus, in order to efficiently separate the coarse particles having a particle size of 40-50 μm and containing silica in a large amount from the powder ore containing a large amount of barium sulfate and having a particle diameter of about 1 μm or less, it is usually preferred that a 500 mesh sieve (having an opening of 25 μm), a 400 mesh sieve (having an opening of 38 μm), or a 325 mesh sieve (having an opening 45 μm) is used. In particular, a sieve having a small opening, for example, a 500 mesh sieve (having an opening of 25 μm) is preferably used.

When the crushed ore is subjected to a media grinding treatment, and a slurry of the powder ore obtained is treated with the mesh wire mentioned above, fine particles having a large content of barium sulfate and a particle size of 1 μm or less promptly pass through the sieve, whereas the coarse particles having a large content of silica and a particle size of 40-50 μm remain on the sieve as they hardly pass through the sieve. As a result, according to the invention, the fine particles having a large content of barium sulfate and a particle size of 1 μm or less is efficiently separated from the coarse particles having a large content of silica.

Thus, according to the invention, after subjecting the crushed ore to an elutriation treatment or without applying the elutriation treatment to the crushed ore, it is subjected to a media grinding treatment to a powder ore having an average particle diameter of 1 μm or less, and the powder ore obtained is subjected to a sieving treatment to remove coarse particles and to reduce the silica content to 0.6% by weight or less, as described above, thereby there is obtained a low alpha dose barium sulfate particle having an alpha dose of 0.07 cph/cm$^2$ or less and a sulfur content of 10 ppm or less.

According to the invention, the step (a), (b) or (c) may be carried out after the crushed ore has been subjected to an acid heating treatment.

The acid heating treatment refers to an operation of heating an aqueous slurry of crushed ore in the presence of an acid. The acid used in the acid heating treatment may be either an inorganic acid or an organic acid, with sulfuric acid being particularly preferred. When an aqueous slurry of crushed ore is heated in the presence of an acid in this way, the crushed ore having a high content of silica is accelerated to be floated to a supernatant in an elutriation bath, so that the crushed ore having a high content of silica is readily removed by decantation.

More specifically, when the crushed ore is first subjected to the acid heating treatment, and then to the step (a), (b), or (c), a powder ore of which amount of silica is further reduced is obtained, and hence a barium sulfate particle having a much lower alpha dose is obtained. In addition, a powder ore from which aluminum, iron, potassium, calcium, sodium, magnesium, phosphorus components and the like have been removed is obtained.

In particular, according to the invention, when the crushed ore having a silica content of 0.8% by weight or more is subjected to the acid heating treatment, the silica content is reduced to 0.7% by weight or less. Therefore, when the crushed ore thus treated is subjected to the step (a), (b), or (c), to prepare a powder ore having a silica content of 0.6% by weight or less and an average particle diameter of 1 μm or less, thereby there is obtained a barium sulfate silicate having a sulfur content of 10 ppm or less and an alpha dose of 0.07 cph/cm$^2$ or less.

Even in the case the crushed ore has a silica content of 0.65% by weight or more and not more than 0.8% by weight, when it is subjected to the acid heating treatment, and then to the step (a), (b), or (c), a barium sulfate particle having a much further reduced in the silica content, and hence having a much reduced alpha dose is obtained.

The low alpha dose barium sulfate particle obtained according to the invention has a purity of 97% or more, preferably 98% or more.

The low alpha dose barium sulfate particle is obtained as described above according to the invention. The low alpha dose barium sulfate particle may be surface-treated in order that it has an improved dispersibility in a resin composition or it has an improved compatibility with a resin component.

As such a surface treatment, a surface treatment with at least one selected from silica, silica hydrate and aluminum hydroxide is preferred.

For the surface treatment of low alpha dose barium sulfate particle with silica hydrate, any known method may be adopted. For instance, an aqueous slurry of low alpha dose barium sulfate particle is heated to a temperature of 50 to 90° C., and an aqueous solution of sodium hydroxide is added to the aqueous slurry, and then an aqueous solution of sodium silicate to the aqueous slurry, and then sulfuric acid, followed by stirring, and the resulting is filtered, washed with water, and dried.

Also for the surface treatment of low alpha dose barium sulfate particle with aluminum hydroxide, any known method may be adopted. For instance, an aqueous solution of sodium hydroxide is added to an aqueous slurry of low alpha dose barium sulfate particle, if necessary, with heating, and then an aqueous solution of sodium aluminate and sulfuric acid, and the resulting is stirred, and then the resulting slurry is filtered, washed with water, and dried.

The amount of silica or silica hydrate with which the low alpha dose barium sulfate particle has been surface-treated, i.e., the surface-treated amount, is preferably in the range of 0.1 to 10% by weight in terms of silica based on the weight of the surface-treated low alpha dose barium sulfate particle, and in particular preferably in the range of 0.5 to 5% by weight. The amount of aluminum hydroxide with which the low alpha dose barium sulfate particle has been surface-treated, i.e., the surface-treated amount, is preferably in the range of 0.1 to 10% by weight in terms of alumina based on the weight of the surface-treated low alpha dose barium sulfate particle, and in particular preferably in the range of 0.5 to 5% by weight.

In either of the surface treatment with silica or silica hydrate, or the surface treatment with aluminum hydroxide, when the surface-treated amount is less than 0.1% by weight based on the surface-treated low alpha dose barium sulfate particle, the effect of surface treatment is not be sufficiently exerted, whereas when it exceeds 10% by weight, the desired function of barium sulfate may be deteriorated.

As the low alpha dose barium sulfate particle obtained according to the invention has a low alpha dose, and moreover is very fine, it is suitably used as a dispersoid in various aqueous or organic dispersions. For example, it is suitably incorporated as a filler in various resin compositions. Examples of the resin composition include a coating composition and a resist ink composition.

In general in the invention, the resin constituting the resin composition may be either a thermoplastic resin or a thermosetting resin. Specific examples include epoxy resin, phenol resin, polyphenylene sulfide (PPS) resin, polyester resin, polyamide, polyimide, maleimide resin, polystyrene, polyethylene, polypropylene, polyvinyl chloride, polyvinylidene chloride, fluororesin, polymethylmethacrylate, ethylene-ethyl acrylate copolymer (EEA) resin, polycarbonate, polyurethane, polyacetal, polyphenylene ether, polyether imide, acrylonitrile-butadiene-styrene copolymer (ABS) resin, liquid crystal resin (LCP), silicone resin, acrylic resin and the like.

In the resin composition, the amount of the low alpha dose barium sulfate particle used is not particularly limited, but it is usually in the range of 5 to 75% by volume, preferably in the range of 10 to 70% by volume, based on the total volume of the resin composition.

EXAMPLES

The invention will be described in detail with reference to examples and comparative examples hereinafter, but the invention is not limited by those examples.

In the following examples and comparative examples, the following barite ores were used:

Barite ore A: mined in China and having a content of barium sulfate of 95% by weight or more Barite ore B: mined in China and having a content of barium sulfate of 95% by weight or more Barite ore C: mined in China and having a content of barium sulfate of 95% by weight or more Barite ore D: mined in Mexico and having a content of barium sulfate and strontium sulfate of 95% by weight or more In the following Examples and Comparative Examples, when an aqueous slurry of crushed ore was first subjected to an acid heating treatment, a small amount of sample was extracted from the obtained aqueous slurry, dried, and the silica content was measured. The silica content is shown in the row of acid heating treatment in Tables 1 and 2.

When an aqueous slurry of crushed ore was subjected to an elutriation treatment, a small amount of sample was extracted from the recovered underflow, filtered and dried, and then the silica content was measured. The silica content is shown in the row of elutriation treatment in Tables 1 and 2.

When an aqueous slurry of crushed ore was subjected to an grinding treatment with or without an elutriation treatment, a small amount of sample was extracted from the slurry after the grinding treatment, filtered and dried, and then the silica content was measured. The silica content is shown in the row of grinding treatment in Tables 1 and 2.

When an aqueous slurry of crushed ore was subjected to a sieving treatment after a grinding treatment, the undersized slurry obtained was filtered and dried, and then the silica content, the average particle diameter and the alpha dose were measured. The silica content, the average particle diameter and the alpha dose are shown in the row of sieving treatment in Tables 1 and 2.

When the product obtained by the grinding treatment or the sieving treatment is an aimed low alpha dose barium sulfate particle, the silica content, the average particle diameter and the alpha dose shown in Tables 1 and 2 are indicated in parentheses.

The sulfur content and the result of silver discoloration test of the low alpha dose barium sulfate particle obtained in the following Examples and Comparative Examples are shown in Tables 1 and 2.

The physical properties of crushed ore, powder ore and low alpha dose barium sulfate particle obtained in the respective steps of the following Examples and Comparative Examples, and the sulfur content and the silver discoloration test were evaluated as follows.

Alpha Dose ($cph/cm^2$)

The alpha dose was measured by use of a low level α-ray measuring apparatus LACS-4000 M (manufactured by Sumika Chemical Analysis Service, Ltd.). The sample was spread on a stainless steel plate (1000 $cm^2$) of the sample measurement section of the apparatus and was measured over a period of 99 hours.

Average Particle Diameter (D50) (μm)

The volume-based median diameter was measured by a laser diffraction/scattering type particle size distribution measuring apparatus Microtrac MT-3300 EXII (manufactured by Nikkiso Co., Ltd.).

Silica ($SiO_2$) Content (% By Weight)

The silica ($SiO_2$) content was measured by use of a fluorescent X-ray analyzer ZSX Primus II (manufactured by Rigaku Corporation). According to the already known method, the measurement of standard sample was conducted to prepare a calibration curve showing the relationship with the fluorescent X-ray intensity, based on which the quantity of silica was determined.

Alumina ($Al_2O_3$) Content (% By Weight)

The alumina ($Al_2O_3$) content was measured by use of a fluorescent X-ray analyzer ZSX. Primus II (manufactured by Rigaku Corporation). According to the already known method, the measurement of standard sample was conducted to prepare a calibration curve showing the relationship with the fluorescent X-ray intensity, based on which the quantity of alumina was determined.

Sulfur Content in Barium Sulfate (Derived from Sulfide)

5 g of low alpha dose barium sulfate particles (sample) and 50 mL of aqueous solution of sodium hydroxide having a concentration of 40 g/L were put in a flask with a stopper. The mixture obtained was stirred at 80° C. for 30 minutes to disperse the low alpha dose barium sulfate particles. After adding 25 mL of 0.01 mol/L of iodine to the obtained dispersion, 5 mL of concentrated hydrochloric acid was added. The mixture is then titrated with 0.005 mol/L sodium thiosulfate using starch as an indicator to provide a sample titration amount. A blank test was conducted with no sample to obtain a blank titration amount, and the sulfur content in the sample was calculated from the following formula:

Sulfur content (ppm)=16×(blank titration amount (mL)−sample titration amount (mL))

Silver Discoloration Test 3 g of low alpha dose barium sulfate particles of the sample was placed in a sample bottle made of glass and having a capacity of 1.00 mL, and the sample bottle was closed with a lid. The sample bottle was placed in a thermo-hygrostat bath previously stabilized at a temperature of 85° C. and a relative humidity of 85% After confirming that the temperature and humidity inside the thermo-hygrostat had reached a predetermined temperature and humidity, a slide glass coated with silver paste (Dotite D 550 manufactured by Fujikura Kasei Co., Ltd.) was placed in the sample bottle under the atmosphere of a thermo-hygrostat chamber, and the lid was closed to seal the sample bottle. After 72 hours, the slide glass was taken out of the sample bottle and the degree of discoloration of the silver paste was visually evaluated.

When the content of sulfide contained as an impurity in the low alpha dose barium sulfate particles of the sample is large, the silver paste is blackened by the sulfide component (hydrogen sulfide) which was volatilized from the sample. The degree of discoloration of the silver paste was evaluated as follows: when the degree of discoloration was equivalent to the degree in the blank test where only the silver paste was tested: ○; when a slight discoloration was observed as compared to the blank: Δ; and when the discoloration was remarkable compared with the blank: ×.

Surface-Treated Amount of Silica or Alumina on Low Alpha Dose Barium Sulfate Particle The surface-treated amount of silica or alumina on low alpha dose barium sulfate particle was measured by use of a fluorescent X-ray analyzer ZSX Primus II (manufactured by Rigaku Corporation). According to the already known method, the measurement of standard sample was conducted to prepare a calibration curve showing the relationship with the fluorescent X-ray intensity, based on which the quantity of the surface-treated amount was determined.

Purity of Barium Sulfate (% By Weight)

The purity of barium sulfate was measured by use of a fluorescent X-ray analyzer ZSX Primus II (manufactured by Rigaku Corporation). According to the already known method, the measurement of standard sample was conducted to prepare a calibration curve showing the relationship with the fluorescent X-ray intensity, based on which the purity of barium sulfate ($BaSO_4$) was determined.

Example 1

Pure water was added to 1500 g of crushed ore obtained by crushing barite ore A and having an alpha dose of 0.13 cph/cm$^2$, an average particle diameter of 10.06 μm and a silica content of 0.70% by weight to prepare 12 L of a slurry having a concentration of 125 g/L as barium sulfate.

120 mL of 62.5% by weight sulfuric acid and 250 mL of 35% by weight hydrochloric acid were added to 30 L of pure water, and further pure water, to prepare a total of 60 L of elutriation water having a pH of 1.6.

An aqueous slurry of the crushed ore was put in an elutriation bath having a capacity of 13 L. 60 L of the above-mentioned elutriation water was continuously introduced into the elutriation bath at a rate of 1 L/min, for one hour from the lower part of the elutriation bath while discarding the overflow from the elutriation bath. Subsequently, while the overflow was discarded, 60 L of pure water was introduced into the elutriation bath at a rate of 1 L/min. for one hour, thereby the underflow was recovered.

The slurry of underflow thus recovered was filtered and the solid obtained was repluped in pure water to prepare a slurry having a concentration of 300 in terms of barium sulfate. A crushed ore having a silica content of 0.62% by weight was obtained by the above-mentioned elutriation treatment.

Four liters of the above slurry was put in a wet bead mill (SC 100 manufactured by Nippon Coke & Engineering Co., Ltd., hereinafter the same unless otherwise noted) containing zirconia beads having a diameter of 0.3 mm ("TORAYCERAM" (registered trademark) manufactured by Toray Industries, Inc.), and ground for 60 minutes to obtain a powder ore having an average particle diameter of 0.27 μm.

The slurry of the powder ore was passed through a 500 mesh sieve (having an opening of 25 μm) to obtain an undersized slurry, which was filtered and dried to obtain a low alpha dose barium sulfate particle having a silica content of 0.49% by weight, an average particle diameter of 0.27 μm, an alpha dose of 0.06 cph/cm$^2$, and a sulfur content of 2 ppm.

Example 2

Pure water was added to 1500 g of crushed ore obtained by crushing barite ore A and having an alpha dose of 0.13 cph/cm$^2$, an average particle diameter of 10.06 μm and a silica content of 0.70% by weight to prepare 12 L of a slurry having a concentration of 125 g/L as barium sulfate.

The aqueous slurry of the crushed ore was subjected to an elutriation treatment in the same manner as in Example 1 to recover an underflow. The slurry of the underflow thus recovered was filtered and the solid obtained was repulped in pure water to prepare a slurry having a concentration of 300 g/L in terms of barium sulfate. A crushed ore having a silica content of 0.62% by weight was obtained by the above-mentioned elutriation treatment.

Four liters of the above slurry was put in a wet bead mill ((Dyno-Mill MULTILAB manufactured by Shinmaru Enterprises Corporation) containing zirconia beads having a diameter of 0.4 mm, and ground for 60 minutes to obtain a powder ore having an average particle diameter of 0.32 μm.

The slurry of the powder ore was passed through a 500 mesh sieve (having an opening of 25 μm) to obtain an undersized slurry, which was filtered and dried to obtain a low alpha dose barium sulfate particle having a silica content of 0.43% by weight, an average particle diameter of 0.32 μm, an alpha dose of 0.05 cph/cm$^2$, and a sulfur content of 2 ppm.

Example 3

125 mL of pure water was added to 1500 g of crushed ore obtained by crushing barite ore B and having an alpha dose of 0.21 cph/cm², an average particle diameter of 9.13 µm and a silica content of 0.87% by weight and stirred. 437.5 mL of 62.5% by weight sulfuric acid and 125 mL of 35% by weight hydrochloric acid were added to the resulting mixture, and after thoroughly stirring, the mixture was heated to 11.0° C. to carry out an acid heating treatment for 3 hours. The slurry of the crushed ore thus acid-heat treated in this way was cooled and washed with water 4 times by decantation. The silica content of the acid heat-treated crushed ore was 0.66% by weight.

Pure water was added to the obtained crushed ore to prepare 12 L of a slurry having a concentration of about 125 g/L in terms of barium sulfate. The slurry was subjected to an elutriation treatment in the same manner as in Example 1 to recover an underflow.

The slurry of the recovered underflow was filtered and the obtained solid was repulped in pure water to prepare a slurry having a concentration of 300 g/L in terms of barium sulfate. A crushed ore having a silica content of 0.55% by weight was obtained by the above-mentioned elutriation treatment.

Four liters of the above-mentioned slurry was ground for 60 minutes with a wet bead mill containing zirconia beads having a diameter of 0.3 mm to obtain a powder ore having an average particle diameter of 0.28 µm.

The slurry of the powder ore was passed through a 500 mesh sieve (having an opening of 25 µm), and the undersized slurry obtained was filtered and dried to obtain a low alpha dose barium sulfate particle having a silica content of 0.25% by weight, an average particle diameter of 0.28 µm, an alpha dose of 0.03 cph/cm², and a sulfur content of 3 ppm.

Example 4

Pure water was added to 1500 g of crushed ore obtained by crushing barite ore C and having an alpha dose of 0.10 cph/cm², an average particle diameter of 11.12 µm and a silica content of 0.67% by weight to prepare 12 L of a slurry having a concentration of about 125 g/L in terms of barium sulfate.

The slurry of the crushed ore was subjected to an elutriation treatment in the same manner as in Example 1 to recover an underflow. The slurry of the recovered underflow was filtered and the obtained solid was repulped in pure water to prepare a slurry having a concentration of 300 g/L in terms of barium sulfate. A crushed ore having a silica content of 0.58% by weight was obtained by the above-mentioned elutriation treatment.

Four liters of the above-mentioned slurry was ground for 60 minutes with a wet bead mill containing zirconia beads having a diameter of 0.3 mm. The slurry obtained was filtered and dried to obtain a low alpha dose barium sulfate particle having a silica content of 0.58% by weight, an average particle diameter of 0.29 µm, an alpha dose of 0.07 cph/cm², and a sulfur content of 1 ppm.

Example 5

Pure water was added to 1500 g of crushed ore obtained by crushing barite ore C and having an alpha dose of 0.10 cph/cm², an average particle diameter of 11.12 µm and a silica content of 0.67% by weight to prepare 12 L of a slurry having a concentration of about 125 g/L in terms of barium sulfate.

Four liters of the above-mentioned slurry was ground for 60 minutes with a wet bead mill containing zirconia beads having a diameter of 0.3 mm to obtain a powder ore having an average particle diameter of 0.28 µm. The slurry of the powder ore was sieved with a 500 mesh sieve (having an opening of 25 µm) to obtain an undersized slurry, which was filtered and dried to obtain a low alpha dose barium sulfate particle having a silica content of 0.56% by weight, an average particle diameter of 0.28 µm, an alpha dose of 0.07 cph/cm², and a sulfur content of 2 ppm.

Example 6

Pure water was added to 1500 g of crushed ore obtained by crushing barite ore A and having an alpha dose of 0.13 cph/cm², an average particle diameter of 10.06 µm and a silica content of 0.70% by weight to prepare 12 L of a slurry having a concentration of about 125 g/L in terms of barium sulfate.

The slurry of the crushed ore was subjected to an elutriation treatment in the same manner as in Example 1 to recover an underflow. The slurry of the recovered underflow was filtered and the obtained solid was repulped in pure water to prepare a slurry having a concentration of 300 g/L in terms of barium sulfate. A crushed ore having a silica content of 0.62% by weight was obtained by the above-mentioned elutriation treatment.

Four liters of the above-mentioned slurry was ground for 60 minutes with a wet bead mill containing zirconia beads having a diameter of 0.8 mm to obtain a powder ore having an average particle diameter of 0.44 µm.

The slurry of the powder ore was sieved with a 500 mesh sieve (having an opening of 25 µm) to obtain an undersized slurry, which was filtered and dried to obtain a low alpha dose barium sulfate particle having a silica content of 0.45% by weight, an average particle diameter of 0.44 µm, an alpha dose of 0.05 cph/cm², and a sulfur content of 1 ppm.

Example 7

Pure water was added to 1500 g of crushed ore obtained by crushing barite ore A and having an alpha dose of 0.13 cph/cm², an average particle diameter of 10.0 µm and a silica content of 0.70% by weight to prepare 12 L of a slurry having a concentration of about 125 g/L in terms of barium sulfate.

The slurry of the crushed ore was subjected to an elutriation treatment in the same manner as in Example 1 to recover an underflow. The slurry of the recovered underflow was filtered and the obtained solid was repulped pure water to prepare a slurry having a concentration of 300 g/L in terms of barium sulfate. A crushed ore having a silica content of 0.62% by weight was obtained by the above-mentioned elutriation treatment.

Four liters of the above-mentioned slurry was ground for 60 minutes with a wet bead mill containing zirconia beads having a diameter of 0.5 mm to obtain a powder ore having an average particle diameter of 0.41 µm.

The slurry of the powder ore was sieved with a 500 mesh sieve (having an opening of 25 µm) to obtain an undersized slurry, which was filtered and dried to obtain a low alpha dose barium sulfate particle having a silica content of 0.44% by weight, an average particle diameter of 0.41. µm, an alpha dose of 0.05 cph/cm², and a sulfur content of 2 ppm.

Example 8

Pure water was added to 1500 g of crushed ore obtained by crushing barite ore A and having an alpha dose of 0.13 cph/cm², an average particle diameter of 10.06 µm and a silica content of 0.70% by weight to prepare 12 L of a slurry having a concentration of about 125 g/L in terms of barium sulfate.

The slurry of the crushed ore was subjected to an elutriation treatment in the same manner as in Example 1 to recover an underflow. The slurry of the recovered underflow was filtered and the obtained solid was repulped in pure water to prepare a slurry having a concentration of 300 g/L in terms of barium sulfate. A crushed ore having a silica content of 0.62% by weight was obtained by the above-mentioned elutriation treatment.

Four liters of the above-mentioned slurry was ground for 60 minutes with a wet bead mill containing zirconia beads having a diameter of 0.65 mm to obtain a powder ore having an average particle diameter of 0.42 μm.

The slurry of the powder ore was sieved with a 500 mesh sieve (having an opening of 25 μm) to obtain an undersized slurry, which was filtered and dried to obtain a low alpha dose barium sulfate particle having a silica content of 0.46% by weight, an average particle diameter of 0.42 μm, an alpha dose of 0.05 cph/cm$^2$, and a sulfur content of 2 ppm.

Example 9

125 mL of pure water was added to 1500 g of crushed ore obtained by crushing barite ore C and having an alpha dose of 0.10 cph/cm$^2$, an average particle diameter of 11.12 μm and a silica content of 0.67% by weight and stirred. 437.5 mL of 62.5% by weight sulfuric acid and 125 mL of 35% by weight hydrochloric acid were added to the resulting mixture, and after thoroughly stirring, the mixture was heated to 110° C. to carry out an acid heating treatment for 3 hours. The slurry of the crushed ore thus acid-heat treated in this way was cooled and washed with water 4 times by decantation to obtain a solid as an acid beat-treated crushed ore. The silica content of the acid heat-treated crushed ore was 0.5% by weight.

Pure water was added to the obtained solid to prepare 12 L of a slurry having a concentration of about 125 g/L in terms of barium sulfate. The slurry was subjected to an elutriation treatment in the same manner as in Example 1 to recover an underflow.

The slurry of the recovered underflow was filtered and the obtained solid was repulped in pure water to prepare a slurry having a concentration of 300 g/L in terms of barium sulfate. A crushed ore having a silica content of 0.41% by weight was obtained by the above-mentioned elutriation treatment.

Four liters of the above-mentioned slurry was ground for 60 minutes with a wet bead mill containing zirconia beads having a diameter of 0.3 mm to obtain a powder ore having an average particle diameter of 0.29 μm.

The slurry of the powder ore was passed through a 500 mesh sieve (having an opening of 25 μm) to obtain an undersized slurry, which was filtered and dried to obtain a low alpha dose barium sulfate particle having a silica content of 0.16% by weight, an average particle diameter of 0.29 μm, an alpha dose of 0.02 cph/cm$^2$, and a sulfur content of 2 ppm.

Example 10

Pure water was added to 1500 g of crushed ore obtained by crushing barite ore C and having an alpha dose of 0.10 cph/cm$^2$, an average particle diameter of 11.12 μm and a silica content of 0.67% by weight to prepare 12 L of a slurry having a concentration of about 125 g/L in terms of barium sulfate.

The slurry of the crushed ore was subjected to an elutriation treatment in the same manner as in Example 1 to recover an underflow. The slurry of the recovered underflow was filtered and the obtained solid was repulped in pure water to prepare a slurry having a concentration of 300 g/L in terms of barium sulfate. A crushed ore having a silica content of 0.62% by weight was obtained by the above-mentioned elutriation treatment.

Four liters of the above-mentioned slurry was ground for 60 minutes with a wet bead mill containing zirconia beads having a diameter of 0.3 mm to obtain a powder ore having an average particle diameter of 0.28 μm.

The slurry of the powder ore was sieved with a 500 mesh sieve (having an opening of 25 μm) to obtain an undersized slurry, which was filtered and dried to obtain a low alpha dose barium sulfate particle having a silica content of 0.37% by weight, an average particle diameter of 0.28 μm, an alpha dose of 0.04 cph/cm$^2$, and a sulfur content of 2 ppm.

Example 11

125 mL of pure water was added to 1500 g of crushed ore obtained by crushing barite ore D and having an alpha dose of 0.49 cph/cm$^2$, an average particle diameter of 10.53 μm and a silica content of 3.24% by weight and stirred. 437.5 mL of 62.5% by weight sulfuric acid and 125 mL of 35% by weight hydrochloric acid were added to the resulting mixture, and after thoroughly stirring, the mixture was heated to 110° C. to carry out an acid heating treatment for 3 hours. The slurry of the crushed ore thus acid heat-treated in this way was cooled and washed with water 4 times by decantation. The silica content of the acid heat-treated crushed ore was 0.67% by weight.

Pure water was added to the crushed ore thus acid-heat treated to prepare 12 L of a slurry having a concentration of about 125 g/L in terms of barium sulfate. The slurry was subjected to an elutriation treatment in the same manner as in Example 1 to recover an underflow.

The slurry of the recovered underflow was filtered and the obtained solid was repulped in pure water to prepare a slurry having a concentration of 300 g/L in terms of barium sulfate. A crushed ore having a silica content of 0.53% by weight was obtained by the above-mentioned elutriation treatment.

Four liters of the above-mentioned slurry was ground for 60 minutes with a wet bead mill containing zirconia beads having a diameter of 0.3 mm to obtain a powder ore having an average particle diameter of 0.28 μm.

The slurry after the grinding treatment was passed through a 500 mesh sieve (having an opening of 25 μm) to obtain an undersized slurry, which was filtered and dried to obtain a low alpha dose barium sulfate particle having a silica content of 0.47% by weight, an average particle diameter of 0.28 μm, an alpha dose of 0.06 cph/cm$^2$, and a sulfur content of 2 ppm.

Example 1.2

Pure water was added to the undersized slurry obtained in Example 10 and, the slurry was diluted to prepare a slurry having a concentration of 150 g/L in terms of barium sulfate. Eight liter of the above slurry (1200 gas barium sulfate) was heated while stirring to a temperature of 70° C., followed by addition thereto an aqueous solution of 30% by weight sodium hydroxide to adjust the pH of the slurry at 9.5.

85 mL of an aqueous solution of sodium silicate having a concentration of 141 g/L in terms of silica was added to the slurry all at once, followed by quantitative dropwise addition of 25.5 mL of 30% by weight sulfuric acid at a feed rate of 0.21 mL/min. over 120 minutes, and stirring was continued for another 60 minutes.

Thereafter, the obtained slurry was cooled to 40° C., and an aqueous solution of 30% by weight sodium hydroxide was added to the slurry to adjust the pH thereof at 8.5. Then, while the slurry was maintained at a pH of 8.5, 108 mL of an aqueous solution of sodium aluminate having a concentration of 267 g/L in terms of alumina and 162 mL of 30% by weight sulfuric acid were added quantitatively at a rate of 1.2 mL/min and at a rate of 1.8 mL/min., respectively, over a period of 90 minutes, followed by continuing stirring the resulting mixture over 30 minutes.

The slurry thus obtained was filtered, washed with water and dried to obtain a low α-dose barium sulfate particle surface-treated with silica hydrate and aluminum hydroxide.

The surface-treated low alpha dose barium sulfate particle thus obtained was found to have an alpha dose of 0.04 cph/cm$^2$ and an average particle diameter of 0.28 μm, a content of silica hydrate of 1.29% by weight in terms of silica, and a content of aluminum hydroxide of 1.89% by weight in terms of alumina.

Comparative Example 1

120 g of crushed ore obtained by crushing barite ore A and having an alpha dose of 0.13 cph/cm$^2$, an average particle diameter of 10.06 μm and a silica content of 0.70% by weight was dispersed in pure water to prepare a slurry having a concentration of 300 g/L in terms of barium sulfate.

0.4 L of the above slurry was subjected to a grinding treatment with 5 passes under a grinding pressure of 160 MPa using a wet type atomization apparatus containing no grinding media (Star burst Minimo HJP-25001 SE, manufactured by Sugino Machine Limited). The obtained slurry was filtered and dried to obtain a barium sulfate particle having a silica content of 0.69% by weight, an average particle diameter of 1.27 μm, an alpha dose of 0.13 cph/cm$^2$, and a sulfur content of 3 ppm.

Comparative Example 2

Pure water was added to 1500 g of crushed ore obtained by crushing barite ore A and having an alpha dose of 0.13 cph/cm$^2$, an average particle diameter of 10.06 μm and a silica content of 0.70% by weight to prepare 12 L of a slurry having a concentration of about 125 g/L in terms of barium sulfate.

The slurry of the crushed ore was subjected to an elutriation treatment in the same manner as in Example 1 to recover an underflow. The slurry of the recovered underflow was filtered and the obtained solid was repulped in pure water to prepare a slurry having a concentration of 300 in terms of barium sulfate. A crushed ore having a silica content of 0.62% by weight was obtained by the above-mentioned elutriation treatment.

Four liters of the above-mentioned slurry was ground for 60 minutes with a wet bead mill containing zirconia beads having a diameter of 0.3 mm, filtered and dried to obtain a barium sulfate particle having a silica content of 0.62% by weight, an average particle diameter of 0.27 μm, an alpha dose of 0.09 cph/cm$^2$, and a sulfur content of 2 ppm.

Comparative Example 3

Pure water was added to 1500 g of crushed ore obtained by crushing barite ore A and having an alpha dose of 0.13 cph/cm$^2$, an average particle diameter of 10.06 μm and a silica content of 0.70% by weight to prepare 12 L of a slurry having a concentration of about 125 in terms of barium sulfate.

The slurry of the crushed ore was subjected to an elutriation treatment in the same manner as in Example 1 to recover an underflow. The slurry of the recovered underflow was filtered and the obtained solid was repulped in pure water to prepare a slurry having a concentration of 300 g/L in terms of barium sulfate. A crushed ore having a silica content of 0.62% by weight was obtained by the above-mentioned elutriation treatment.

Four liters of the above-mentioned slurry was ground for 60 minutes with a wet bead mill containing zirconia beads having a diameter of 0.8 mm, filtered and dried to obtain a barium sulfate particle having a silica content of 0.61% by weight, an average particle diameter of 0.45 μm, an alpha dose of 0.09 cph/cm$^2$, and a sulfur content of 3 ppm.

Comparative Example 4

Pure water was added to 1500 g of crushed ore obtained by crushing barite ore A and having an alpha dose of 0.13 cph/cm$^2$, an average particle diameter of 10.06 μm and a silica content of 0.70% by weight to prepare 12 L of a slurry having a concentration of about 125 g/L in terms of barium sulfate.

The slurry of the crushed ore was subjected to an elutriation treatment in the same manner as in Example 1 to recover an underflow. The slurry of the recovered underflow was filtered and the obtained solid was repulped in pure water to prepare a slurry having a concentration of 300 g/L in terms of barium sulfate. A crushed ore having a silica content of 0.63% by weight was obtained by the above-mentioned elutriation treatment.

0.4 L of the above slurry was subjected to a grinding treatment with 7 passes under a grinding pressure of 1.60 MPa using a wet type atomization apparatus containing no grinding media. The obtained slurry was filtered and dried to obtain a barium sulfate particle having a silica content of 0.63% by weight, an average particle diameter of 1.00 μm, an alpha dose of 0.09 cph/cm$^2$, and a sulfur content of 2 ppm.

Comparative Example 5

Pure water was added to 1500 g of crushed ore obtained by crushing barite ore A and having an alpha dose of 0.13 cph/cm$^2$, an average particle diameter of 10.06 μm and a silica content of 0.70% by weight to prepare 12 L of a slurry having a concentration of about 125 g/L in terms of barium sulfate.

The slurry of the crushed ore was subjected to an elutriation treatment in the same manner as in Example 1 to recover an underflow. The slurry of the recovered underflow was filtered and the obtained solid was repulped in pure water to prepare a slurry having a concentration of 300 g/L in terms of barium sulfate. A crushed ore having a silica content of 0.62% by weight was obtained by the above-mentioned elutriation treatment.

Four liters of the above-mentioned slurry was ground for 300 minutes with a wet bead mill containing zirconia beads having a diameter of 1.5 mm to obtain a slurry, which was filtered and dried to obtain a barium sulfate particle having a silica content of 0.62% by weight, an average particle diameter of 0.59 μm, an alpha dose of 0.09 cph/cm$^2$, and a sulfur content of 2 ppm.

Comparative Example 6

Pure water was added to 1500 g of crushed ore obtained by crushing barite ore A and having an alpha dose of 0.13 cph/cm$^2$, an average particle diameter of 1.0.06 μm and a silica content of 0.70% by weight to prepare 5 L of a slurry having a concentration of about 300 g/L in terms of barium sulfate.

Four liters of the above-mentioned slurry was ground for 60 minutes with a wet bead mill containing zirconia beads having a diameter of 0.3 mm to obtain a slurry, which was filtered and dried to obtain a barium sulfate particle having a silica content of 0.69% by weight, an average particle diameter of 0.27 μm, an alpha dose of 0.13 cph/cm$^2$, and a sulfur content of 2 ppm.

Comparative Example 7

A crushed ore obtained by crushing barite ore B and having an alpha dose of 0.21 cph/cm$^2$, an average particle diameter of 9.13 μm and a silica content of 0.87% by weight and cokes were placed in a crucible and thoroughly mixed. The mixture was then calcined in an electric furnace and then leached into pure water to obtain an aqueous solution of barium sulfide, to which an aqueous solution of 30% by weight sulfuric acid was added to effect the reaction of barium sulfide with sulfuric acid to precipitate barium sulfate, which was filtered to obtain a barium sulfate particle.

The barium sulfate particle obtained was found to have a silica content of 0.25% by weight, an average particle diameter of 0.30 μm, an alpha dose of 0.12 cph/cm$^2$, and a sulfur content of 170 ppm.

Comparative Example 8

Pure water was added to 1500 g of crushed ore obtained by crushing barite ore C and having an alpha dose of 0.10 cph/cm$^2$, an average particle diameter of 11.12 μm and a silica content of 0.67% by weight to prepare 5 L of a slurry having a concentration of about 300 g/L in terms of barium sulfate.

Four liters of the above-mentioned slurry was ground for 60 minutes with a wet bead mill containing zirconia beads having a diameter of 0.3 mm to obtain a slurry, which was filtered and dried to obtain a barium sulfate particle having a silica content of 0.66% by weight, an average particle diameter of 0.28 μm, an alpha dose of 0.10 cph/cm$^2$, and a sulfur content of 3 ppm.

TABLE 1

| | EXAMPLES | | | | | | | | | |
|---|---|---|---|---|---|---|---|---|---|---|
| | 1 | 2 | 3 | 4 | 5 | 6 | 7 | 8 | 9 | 10 |
| Barite ore | A | A | B | C | C | A | A | A | C | C |
| Crushed ore | | | | | | | | | | |
| Silica content (% by weight) | 0.70 | 0.70 | 0.87 | 0.67 | 0.67 | 0.70 | 0.70 | 0.70 | 0.67 | 0.67 |
| Average particle size (μm) | 10.06 | 10.06 | 9.13 | 11.12 | 11.12 | 10.06 | 10.06 | 10.06 | 11.12 | 11.12 |
| Alpha dose (cph/cm$^2$) | 0.13 | 0.13 | 0.21 | 0.10 | 0.10 | 0.13 | 0.13 | 0.13 | 0.10 | 0.10 |
| Acid heating treatment | No | No | | No | No | No | No | No | | No |
| Silica content (% by weight) | | | 0.66 | | | | | | 0.5 | |
| Elutriation Treatment | | | | | No | | | | | |
| Silica content (% by weight) | 0.62 | 0.62 | 0.55 | 0.58 | | 0.62 | 0.62 | 0.62 | 0.41 | 0.62 |
| Grinding treatment | | | | | | | | | | |
| Silica content (% by weight) | 0.62 | 0.61 | 0.54 | (0.58) | 0.66 | 0.62 | 0.62 | 0.62 | 0.4 | 0.61 |
| Average particle size (μm) | 0.27 | 0.32 | 0.28 | (0.29) | 0.28 | 0.44 | 0.41 | 0.42 | 0.29 | 0.28 |
| Alpha dose (cph/cm$^2$) | | | | (0.07) | | | | | | |
| Sieving treatment | | | | No | | | | | | |
| Silica content (% by weight) | (0.49) | (0.43) | (0.25) | | (0.56) | (0.45) | (0.44) | (0.46) | (0.16) | (0.37) |
| Average particle size (μm) | (0.27) | (0.32) | (0.28) | | (0.28) | (0.44) | (0.41) | (0.42) | (0.29) | (0.28) |
| Alpha dose (cph/cm$^2$) | (0.06) | (0.05) | (0.03) | | (0.07) | (0.05) | (0.05) | (0.05) | (0.02) | (0.04) |
| Low alpha dose BaSO$_4$ | | | | | | | | | | |
| Silica content (% by weight) | 0.49 | 0.43 | 0.25 | 0.58 | 0.56 | 0.45 | 0.44 | 0.46 | 0.16 | 0.37 |
| Average particle size (μm) | 0.27 | 0.32 | 0.28 | 0.29 | 0.28 | 0.44 | 0.41 | 0.42 | 0.29 | 0.28 |
| Alpha dose (cph/cm$^2$) | 0.06 | 0.05 | 0.03 | 0.07 | 0.07 | 0.05 | 0.05 | 0.05 | 0.02 | 0.04 |
| Sulfur content (ppm) | 2 | 2 | 3 | 1 | 2 | 1 | 2 | 2 | 2 | 2 |
| Silver discoloration test | ○ | ○ | ○ | ○ | ○ | ○ | ○ | ○ | ○ | ○ |
| Purity of BaSO$_4$ (% by weight) | 98.8 | 98.6 | 98.1 | 98.3 | 98.2 | 98.5 | 98.4 | 98.2 | 98.7 | 98.7 |

TABLE 2

| | EXAMPLES | COMPARATIVE | | | | | | | |
|---|---|---|---|---|---|---|---|---|---|
| | 11 | 1 | 2 | 3 | 4 | 5 | 6 | 7 | 8 |
| Barite ore | D | A | A | A | A | A | A | B | C |
| Crushed ore | | | | | | | | | |
| Silica content (% by weight) | 3.24 | 0.70 | 0.70 | 0.70 | 0.70 | 0.70 | 0.70 | 0.87 | 0.67 |
| Average particle size (μm) | 10.53 | 10.06 | 10.06 | 10.06 | 10.06 | 10.06 | 10.06 | 9.13 | 11.12 |
| Alpha dose (cph/cm$^2$) | 0.49 | 0.13 | 0.13 | 0.13 | 0.13 | 0.13 | 0.13 | 0.21 | 0.10 |

TABLE 2-continued

|  | EXAMPLES | COMPARATIVE | | | | | | | |
|---|---|---|---|---|---|---|---|---|---|
|  | 11 | 1 | 2 | 3 | 4 | 5 | 6 | 7 | 8 |
| Acid heating treatment |  | No | No | No | No | No | No | No | No |
| Silica content (% by weight) | 0.67 |  |  |  |  |  |  |  |  |
| Elutriation Treatment |  | No |  |  |  |  | No | No | No |
| Silica content (% by weight) | 0.53 |  | 0.62 | 0.62 | 0.63 | 0.62 |  |  |  |
| Grinding treatment |  |  |  |  |  |  |  | No |  |
| Silica content (% by weight) | 0.53 | (0.69) | (0.62) | (0.61) | (0.63) | (0.62) | (0.69) |  | (0.66) |
| Average particle size (μm) | 0.28 | (1.27) | (0.27) | (0.45) | (1.00) | (0.59) | (0.27) |  | (0.28) |
| Alpha dose (cph/cm²) |  |  |  |  |  |  |  |  |  |
| Sieving treatment |  | No | No | No | No | No | No | No | No |
| Silica content (% by weight) | (0.47) |  |  |  |  |  |  |  |  |
| Average particle size (μm) | (0.28) |  |  |  |  |  |  |  |  |
| Alpha dose (cph/cm²) | (0.06) |  |  |  |  |  |  |  |  |
| Low alpha dose BaSO$_4$ |  |  |  |  |  |  |  |  |  |
| Silica content (% by weight) | 0.47 | 0.69 | 0.62 | 0.61 | 0.63 | 0.62 | 0.69 | 0.25 | 0.66 |
| Average particle size (μm) | 0.28 | 1.27 | 0.27 | 0.45 | 1.00 | 0.59 | 0.27 | 0.30 | 0.28 |
| Alpha dose (cph/cm²) | 0.06 | 0.13 | 0.09 | 0.09 | 0.09 | 0.09 | 0.13 | 0.12 | 0.10 |
| Sulfur content (ppm) | 2 | 3 | 2 | 3 | 2 | 2 | 2 | 170 | 3 |
| Silver discoloration test | ○ | ○ | ○ | ○ | ○ | ○ | ○ | x | ○ |
| Purity of BaSO$_4$ (% by weight) | 98.6 | 98.2 | 97.6 | 98.3 | 98.3 | 98.1 | 97.9 | 98.8 | 98.6 |

As shown in Tables 1 and 2, according to the examples of the invention, when a crushed ore obtained by crushing barite ore is subjected to the steps (a), (b), or (c) without an acid heating treatment or after having been subjected to an acid heating treatment, there is obtained a low alpha dose barium sulfate particle having an average particle diameter of 1 μm or less, a silica content of 0.6% by weight or less, a sulfur content of 10 ppm or less, and an alpha dose of 0.07 cph/cm² or less.

In contrast, in Comparative Example 1, as the crushed ore was ground with a wet grinding apparatus using no grinding media instead of a media grinding treatment without elutriation and sieving, a powder ore having an average particle diameter of 1 μm or less and a silica content of 0.6% by weight or less was not obtained, and consequently, a low alpha dose barium sulfate particle having an alpha dose of 0.07 cph/cm² or less was not obtained.

In Comparative Example 4, the crushed ore was subjected to an elutriation treatment, but a crushed ore having a silica content of 0.6% by weight or less was not obtained. In addition, as the resulting crushed ore was subjected to a grinding treatment using a wet grinding apparatus containing no grinding media after the elutriation treatment, a low alpha dose barium sulfate particle having a silica content of 0.6% by weight or less and an alpha dose of 0.07 cph/cm² or less was not obtained.

In Comparative Examples 2, 3 and 5, any of the powder ores obtained by treating the crushed ore by the step (a), (b), or (c) was found to have a silica content of more than 0.6% by weight, and consequently a low alpha dose barium sulfate particle having a low alpha dose of 0.07 cph/cm² or less was not obtained.

In Comparative Examples 6 and 8, as the crushed ore was subjected neither to an elutriation treatment nor to a sieving treatment, but was subjected only to a media grinding treatment, the obtained barium sulfate had a silica content of more than 0.6% by weight. Thus, a low alpha dose barium sulfate particle having an alpha dose of 0.07 cph/cm² or less was not obtained.

In Comparative Example 7, the crushed ore was not subjected to any treatment, but was reduced and calcined to obtain an aqueous solution of barium sulfide, to which sulfuric acid was added to obtain barium sulfate. The barium sulfate thus obtained was found to have a silica content of 0.6% by weight or less, however, it was found to have a high alpha dose and a sulfur content.

Example 13

(Preparation of Coating Composition and Alpha Dose of Coating Film Obtained)

16 g of barium sulfate obtained in Example 4, 20 g of varnish (ACRYDIC A-801-P, manufactured by DIC Corporation), 10 g of butyl acetate (of guaranteed reagent; manufactured by Wako Pure Chemical Industry Co., Ltd.), 10 g of xylene (of guaranteed reagent; manufactured by Junsei Chemical Co., Ltd.), and 76 g of glass beads (1.5 mm in diameter; manufactured by Potters-Ballotini Co., Ltd.) were placed in a 140 mL capacity mayonnaise bottle. After thoroughly mixing the content, the mayonnaise bottle was fixed to a paint conditioner (5410, manufactured by RED DEVIL Eqiupment Co.), subjected to shaking for 60 minutes, and then subjected to dispersion treatment to prepare a coating composition.

The coating composition was dropped on polyethylene film, and a coating film was formed thereon using a bar coater (No. 579 ROD No. 6, manufactured by Yasuda Seiki Seisakusho Ltd.) having a pigment weight concentration (PWC) of 61.5% by weight.

After drying the coating film at 20° C. for 12 hours, the alpha dose was measured using a low level α-ray measuring device LACS-4000M (manufactured by Sumika Chemical Analysis Service, Ltd.) to find that it had an alpha dose of 0.04 cph/cm². In the measurement, the coating film was placed on a stainless steel plate (1000 cm²) of the sample measuring section of the apparatus and measured over a period of 99 hours.

Comparative Example 9

(Preparation of Coating Composition and Alpha Dose of Coating Film Obtained)

A coating composition was prepared in the same manner as in Example 13 except that barium sulfate obtained in Comparative Example 6 was used in place of the barium sulfate obtained in Example 4. The coating film was found to have an alpha dose of 0.08 cph/cm².

Example 14

(Preparation of Resin Composition Sheet and Measurement of Alpha Dose Thereof)

56 g of barium sulfate obtained in Example 4 and 24 g of ethylene-ethyl acrylate copolymer resin (EEA resin manufactured by Japan Polyethylene Corporation, Rexpearl (Registered trademark) A 1150) was kneaded for 10 minutes using a LABO PLASTMILL (manufactured by Toyo Seiki Seisaku-Sho, Ltd.) under the conditions of rotation rate of mixer of 40 rpm and at a temperature of 150° C.

The kneaded product obtained was taken out of the mixer, and was placed on the center of a stainless steel mold plate (150 mm×200 mm) having a thickness of 2 mm. It was sandwiched between a pair of stainless steel plates (200 mm×300 mm) and placed on a sample stand of MINI TEST PRESS 10 (manufactured by Toyo Seiki Seisaku-Sho, Ltd.), and pressurized at 0.5 MPa for 2 minutes while heating at 160° C., the pressure was further raised to 5 MPa and pressurized for 2 minutes while heating at 160° C., and then the pressure was increased to 25 MPa and pressurized for 3 minutes while heating at 160° C.

Thereafter, while pressurizing at 25 MPa, it was cooled for 5 minutes to obtain a resin composition sheet having a filling rate of filler of 70% by weight. The alpha dose of the sheet of resin composition obtained was measured using a low level alpha dose measuring apparatus LACS-4000M (manufactured by Sumika Chemical Analysis Service, Ltd.). The sheet was found to have an alpha dose of 0.05 cph/cm². In the measurement, the coating film was placed on a stainless steel plate (1000 cm²) of the sample measuring section of the apparatus and measured over a period of 99 hours.

Comparative Example 10

(Preparation of Sheet of Resin Composition and Measurement of Alpha Dose Thereof)

A sheet of resin composition was prepared in the same manner as in Example 14 except that barium sulfate obtained in Comparative Example 6 was used in place of the barium sulfate obtained in Example 4, and the alpha dose of the sheet of resin composition obtained was measured in the same manner as above. The sheet was found to have an alpha dose of 0.09 cph/cm².

As shown in Examples 13, 14, Comparative Examples 9 and 10, the coating film and the sheet of resin composition in which the low alpha dose barium sulfate according to the invention was incorporated exhibit a lower alpha dose than the barium sulfate itself incorporated in the coating film and the sheet of resin composition.

However, the coating film and the sheet of resin composition in which barium sulfate obtained in Comparative Example 6 was incorporated were found to have an alpha dose of more than 0.07 cph/cm².

As shown in Examples, the low alpha dose barium sulfate particle having an alpha dose of 0.07 cph/cm² or less is obtained by the process of the invention with no necessity of complicated operations for high purity. Such a low alpha dose barium sulfate particle is suitably used for a solder resist layer of a high functional electronic component in which an underfill layer is thinned.

The invention claimed is:

1. A process for producing a low alpha dose barium sulfate particle comprising:
    subjecting a crushed ore obtained by crushing barite ore and having an average particle diameter of 5-50 μm, an alpha dose of 1 cph/cm² or less, and a silica content in a range of 0.65-1% by weight to:
    (a) an elutriation treatment and a media grinding in this order; or
    (b) a media grinding treatment and a sieving treatment in this order; or
    (c) an elutriation treatment, a media grinding treatment and a sieving treatment in this order,
    wherein in the media grinding treatment, the crushed ore is ground to a powder ore having an average particle diameter of 1 μm or less while coarse particles are removed by the elutriation treatment and/or the sieving treatment to obtain a powder ore having a silica content of 0.6% by weight or less, thereby obtaining a low alpha dose barium sulfate particle having an average particle diameter of 1 μm or less, a silica content of 0.6% by weight or less, an alpha dose of 0.07 cph/cm² or less, and a sulfur content of 10 ppm or less.

2. The process for producing low alpha dose barium sulfate particles according to claim 1, wherein the crushed ore is subjected to an acid heating treatment, and then to the step (a), (b), or (c).

3. A process for producing a surface-treated low alpha dose barium sulfate particle comprising:
    subjecting a crushed ore obtained by crushing barite ore and having an average particle diameter of 5-50 μm, an alpha dose of 1 cph/cm² or less, and a silica content in a range of 0.65-1% by weight to:
    (a) an elutriation treatment and a media grinding in this order; or
    (b) a media grinding treatment and a sieving treatment in this order; or
    (c) an elutriation treatment, a media grinding treatment and a sieving treatment in this order,
    wherein in the media grinding treatment, the crushed ore is ground to a powder ore having an average particle diameter of 1 μm or less while coarse particles are removed by the elutriation treatment and/or the sieving treatment to obtain a powder ore having a silica content of 0.6% by weight or less, thereby obtaining a low alpha dose barium sulfate particle having an average particle diameter of 1 μm or less, a silica content of 0.6% by weight or less, an alpha dose of 0.07 cph/cm² or less, and a sulfur content of 10 ppm or less, and
    surface-treating the low alpha dose barium sulfate particle with at least one of silica, silica hydrate and aluminum hydroxide.

4. The process for producing surface-treated low alpha dose barium sulfate particles according to claim 3, wherein the crushed ore is subjected to an acid heating treatment, and then to the step (a), (b), or (c).

* * * * *